(12) United States Patent
Wanta et al.

(10) Patent No.: US 12,711,533 B2
(45) Date of Patent: Aug. 18, 2026

(54) CREATING GOLFER PROFILES USING DRIVING HABITS

(71) Applicant: Textron Inc., Providence, RI (US)

(72) Inventors: Brian David Wanta, North Augusta, SC (US); Christopher Alexander Boehm, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 69 days.

(21) Appl. No.: 18/673,798

(22) Filed: May 24, 2024

(65) Prior Publication Data

US 2025/0363540 A1 Nov. 27, 2025

(51) Int. Cl.
*G06Q 30/00* (2023.01)
*A63B 71/06* (2006.01)
*G06Q 10/0875* (2023.01)
*G06Q 30/0601* (2023.01)
*A63B 69/36* (2006.01)

(52) U.S. Cl.
CPC ..... *G06Q 30/0631* (2013.01); *A63B 71/0686* (2013.01); *G06Q 10/0875* (2013.01); *A63B 69/3691* (2013.01); *A63B 2220/62* (2013.01)

(58) Field of Classification Search
CPC ............................................... G06Q 30/06–08
See application file for complete search history.

(56) References Cited

U.S. PATENT DOCUMENTS 4,910,677 A 3/1990 Remedio et al.
5,086,390 A 2/1992 Matthews
5,097,416 A 3/1992 Matthews
5,326,095 A 7/1994 Dudley
5,438,518 A 8/1995 Bianco et al.
5,507,485 A 4/1996 Fisher
5,685,786 A 11/1997 Dudley
5,740,077 A 4/1998 Reeves
5,772,534 A 6/1998 Dudley
5,810,680 A 9/1998 Lobb et al.
6,236,360 B1 5/2001 Rudow et al.
6,263,279 B1 7/2001 Bianco et al.
7,031,947 B1 * 4/2006 Bingeman .............. G06Q 30/06 701/1
7,175,177 B2 * 2/2007 Meifu ................ A63B 71/0669 473/131

(Continued)

OTHER PUBLICATIONS

Motorola et al., "Golf Cart Tracking and Communication Systems", IP.com Prior Art Database Technical Disclosure, IPCOM000005983D, Oct. 1, 1990 (Year: 1990).*

*Primary Examiner* — Ethan D Civan
(74) *Attorney, Agent, or Firm* — Foley & Lardner LLP

(57) ABSTRACT

A golf system includes one or more processing circuits including one or more memory devices coupled to one or more processors. The one or more memory devices are configured to store instructions thereon that, when executed by the one or more processors, cause the one or more processors to associate an identifier of a respective player assigned to a golf cart with the golf cart, monitor at least one of locations of the golf cart about a golf course or purchases made on the golf course associated with the identifier, and update a player profile for the respective player based on the identifier and the at least one of the locations of the golf cart or the purchases.

20 Claims, 8 Drawing Sheets

(56) References Cited

U.S. PATENT DOCUMENTS

| | | | |
|---|---|---|---|
| 7,922,586 | B2 | 4/2011 | Heckendorf et al. |
| 7,953,617 | B2 * | 5/2011 | Smeenge ............. G06Q 10/026 473/150 |
| 9,656,147 | B2 | 5/2017 | Reeves |
| 10,905,933 | B2 | 2/2021 | Messner et al. |
| 11,813,514 | B2 | 11/2023 | Mccartin |
| 2001/0006489 | A1 | 7/2001 | Gaffney |
| 2002/0052750 | A1 | 5/2002 | Hirooka |
| 2002/0072815 | A1 | 6/2002 | Mcdonough et al. |
| 2002/0188359 | A1 | 12/2002 | Morse |
| 2003/0149496 | A1 | 8/2003 | Johnson |
| 2003/0163210 | A1 | 8/2003 | Adams |
| 2003/0191547 | A1 | 10/2003 | Morse |
| 2004/0243262 | A1 * | 12/2004 | Hofmann ........... A63B 71/0605 700/91 |
| 2005/0030223 | A1 | 2/2005 | Nozawa |
| 2007/0060408 | A1 | 3/2007 | Schultz et al. |
| 2007/0099715 | A1 | 5/2007 | Jones et al. |
| 2008/0058125 | A1 | 3/2008 | Nguyen |
| 2008/0188330 | A1 | 8/2008 | Doherty et al. |
| 2008/0201107 | A1 | 8/2008 | Doherty et al. |
| 2009/0082139 | A1 | 3/2009 | Hart |
| 2009/0280930 | A1 | 11/2009 | Lin et al. |
| 2009/0305822 | A1 | 12/2009 | Ko |
| 2010/0160089 | A1 | 6/2010 | Lin et al. |
| 2013/0029790 | A1 | 1/2013 | Clark |
| 2015/0182836 | A1 | 7/2015 | Freeman et al. |
| 2015/0221016 | A1 * | 8/2015 | Schulz ............... G06Q 30/0631 705/26.7 |
| 2015/0297970 | A1 | 10/2015 | Witkoski et al. |
| 2016/0228757 | A1 | 8/2016 | Rhule et al. |
| 2016/0325171 | A1 | 11/2016 | Niegowski |
| 2017/0164152 | A1 | 6/2017 | Rosenthal |
| 2017/0216703 | A1 | 8/2017 | Stephens et al. |
| 2017/0323236 | A1 | 11/2017 | Quintavalla et al. |
| 2018/0200605 | A1 * | 7/2018 | Syed .................. A63B 71/0669 |
| 2018/0204227 | A1 | 7/2018 | Mohindru et al. |
| 2019/0244265 | A1 | 8/2019 | Van Sant et al. |
| 2022/0083921 | A1 | 3/2022 | Brkic et al. |
| 2023/0196214 | A1 | 6/2023 | Cordero et al. |
| 2023/0305145 | A1 * | 9/2023 | Lock ...................... G06V 20/56 |

* cited by examiner

690

692

Aggregate pace of play for various players

694

Acquire tee sheet for future date

696

Optimize tee sheet based on the player profiles

CREATING GOLFER PROFILES USING DRIVING HABITS

BACKGROUND

Golfers may benefit from a more enhanced and personalized experience on a golf course.

SUMMARY

One embodiment relates to a golf system. The golf system includes one or more processing circuits including one or more memory devices coupled to one or more processors. The one or more memory devices are configured to store instructions thereon that, when executed by the one or more processors, cause the one or more processors to associate an identifier of a respective player assigned to a golf cart with the golf cart, monitor at least one of locations of the golf cart about a golf course or purchases made on the golf course associated with the identifier, and update a player profile for the respective player based on the identifier and the at least one of the locations of the golf cart or the purchases.

Another embodiment relates to a golf system. The golf system includes a non-transitory computer-readable medium having instructions stored thereon that, when executed by one or more processors, cause the one or more processors to associate an identifier of a respective player assigned to a golf cart with the golf cart, monitor locations of the golf cart about a golf course, monitor purchases made on the golf course associated with the identifier, and update a player profile for the respective player based on the identifier, the locations of the golf cart, and the purchases.

Still another embodiment relates to a golf system. The golf system includes a non-transitory computer-readable medium having instructions stored thereon that, when executed by one or more processors, cause the one or more processors to associate an identifier of a respective player assigned to a golf cart with the golf cart, monitor locations of the golf cart about a golf course, monitor purchases made on the golf course associated with the identifier, update a player profile for the respective player based on the identifier, the locations of the golf cart, and the purchases, and at least one of (a) acquire a tee sheet for a future point in time including a list of players and predict an inventory of goods to have present on the golf course based on the player profile of the respective player in response to the list of players including the respective player, (b) recommend a purchase of a respective good to the respective golfer based on the player profile of the respective player in response to a current location of the golf cart associated with the respective player being proximate a past location on the golf course where a previous purchase of the respective good was purchased, or (c) instruct preparation of a respective good for the respective golfer based on the player profile of the respective player in response to the current location of the golf cart associated with the respective player being proximate the past location on the golf course where the previous purchase of the respective good was purchased.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
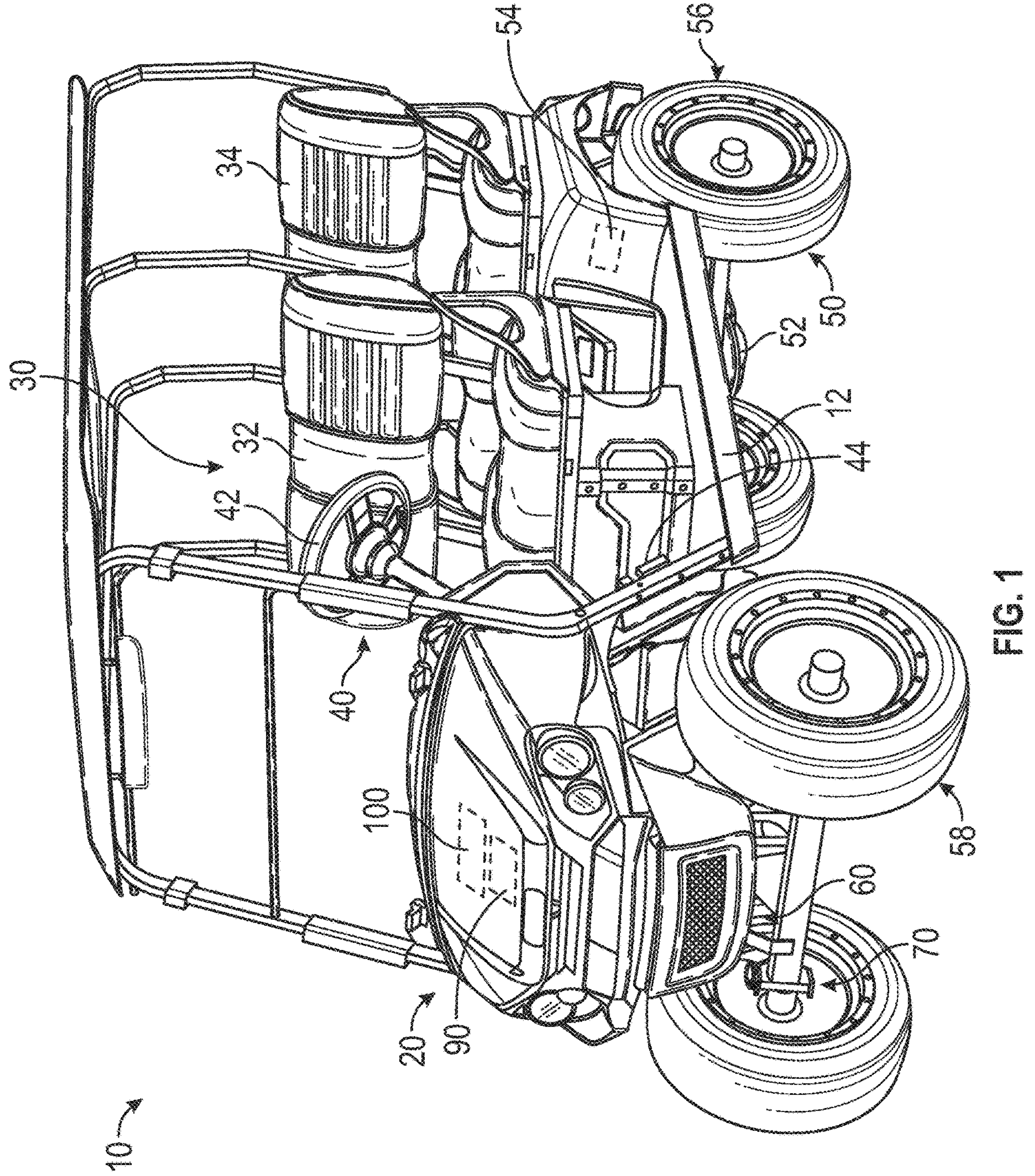
FIG. 1 is a perspective view of a vehicle, according to an exemplary embodiment.
Figure 2:
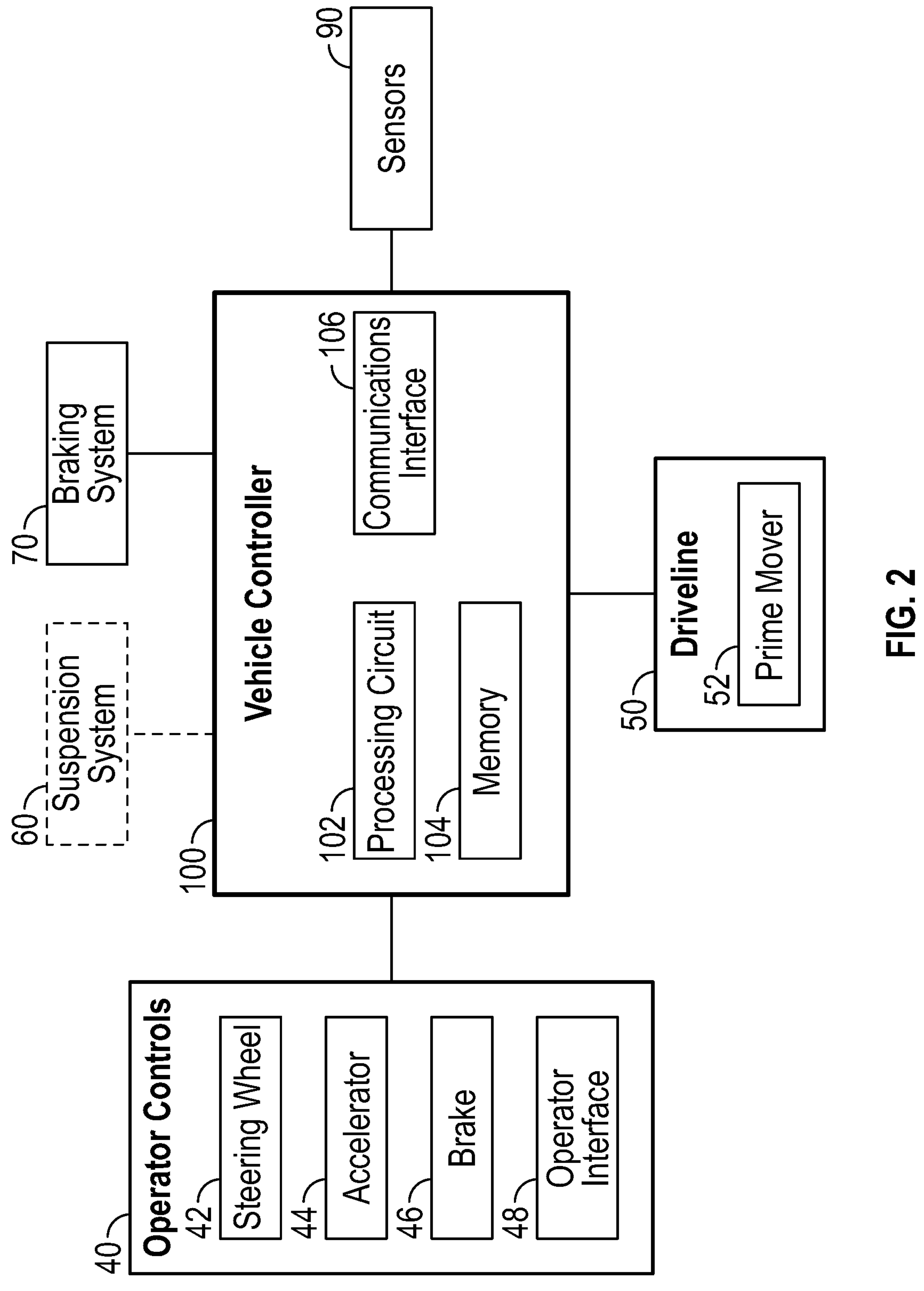
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a vehicle control system, shown as vehicle controller 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/ middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle controller 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle controller 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle controller 100 may represent a collection of processing devices. In such cases, the processing circuit 102 represents the collective processors of the devices, and the memory 104 represents the collective storage devices of the devices.

In one embodiment, the vehicle controller 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle controller 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle controller 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
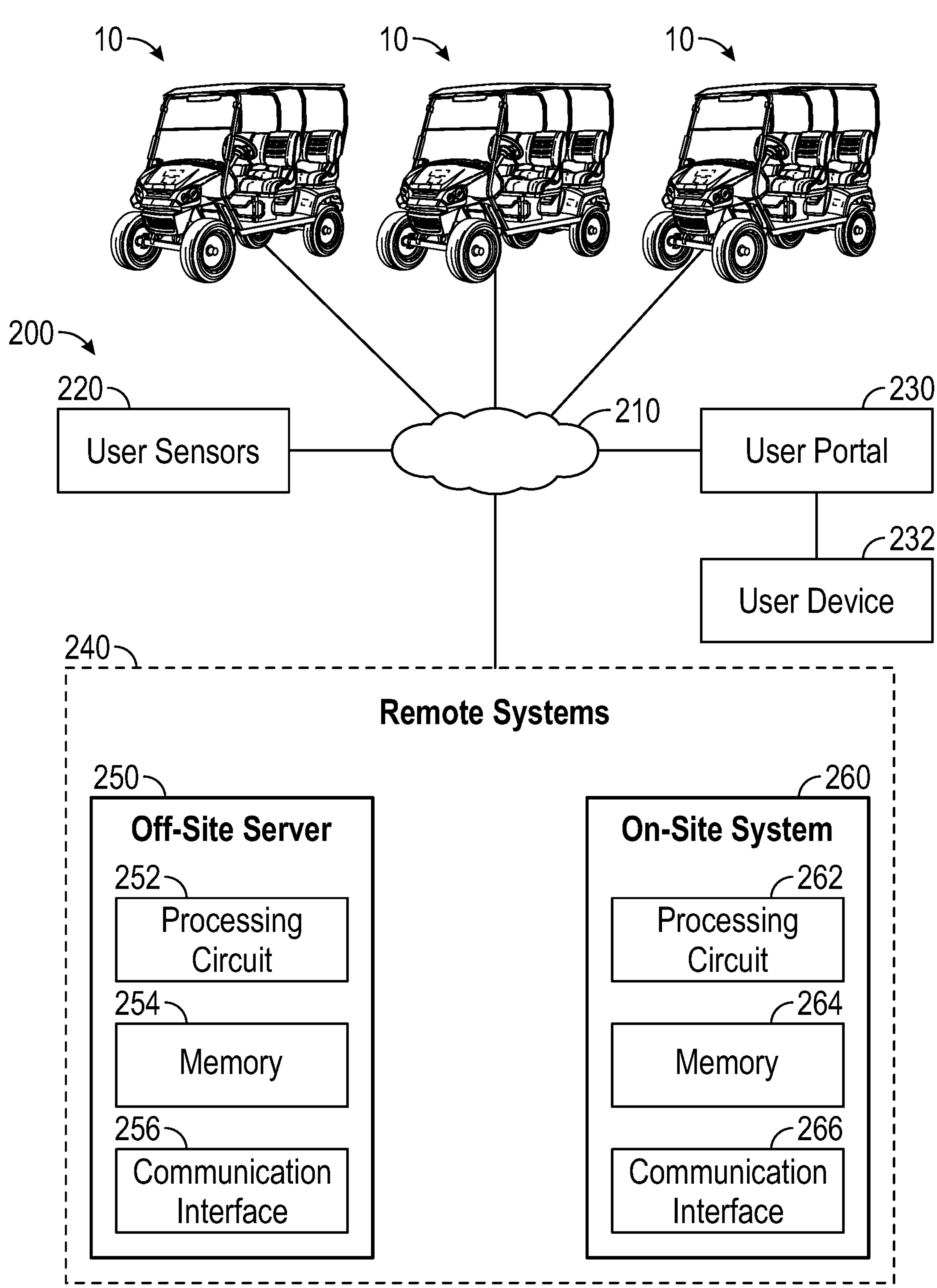
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Creating Golfer Profile Using Driving Habits

Figure 4:
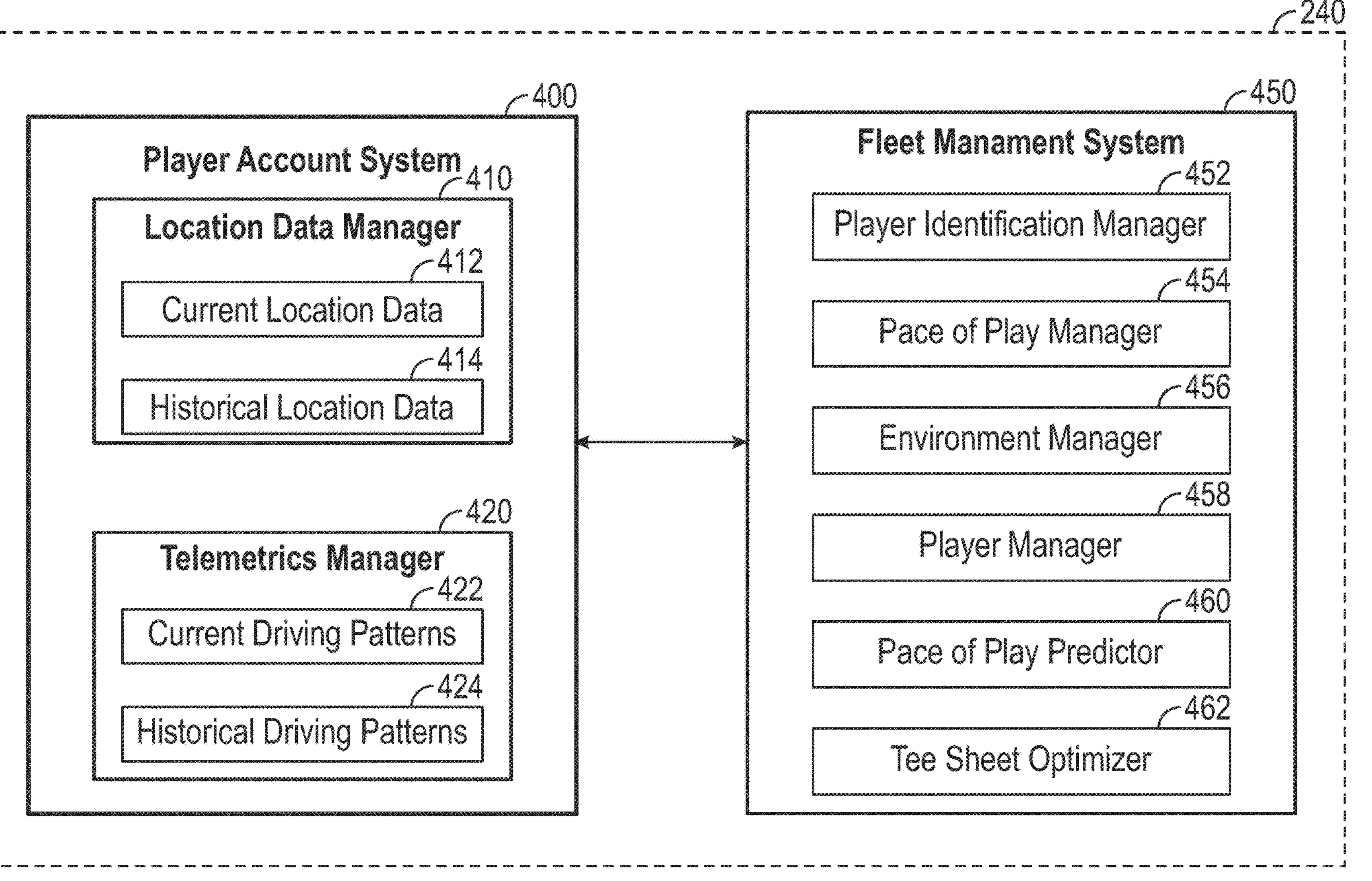
FIG. 4 is a schematic block diagram of a remote system of the site monitoring and control system of FIG. 3, according to an exemplary embodiment.

In various embodiments, one or more components of the remote systems 240 may utilize a user profile of a player to optimize the player's playing experience. Referring now to FIG. 4, components of the remote systems 240 are shown in greater detail. As shown in FIG. 4, the remote systems 240 include a player account system 400 and a fleet management system 450. Each of the player account system 400 and the fleet management system 450 may be an off-site server 250, an on-site system 260, or a combination thereof.

The player account system 400 may be or include any device, component, element, or hardware designed or configured to track user preferences and/or performance data of a player of a golf course. The player account system 400 may be communicably coupled to one or more components of the remote systems 240, such as the fleet management system 450. The player account system 400 may be configured to store information about the player. For example, the player account system 400 may include identifying information such as the player's name, age, address, member number, etc. The player account system 400 may also include information about the player's playing statistics. For example, the player account system 400 may include information about the player's handicap.

As shown in FIG. 4, the player account system 400 include a location data manager 410. The location data manager 410 may be or include any device, component, element, or hardware designed or configured to track current and historic locations of the player while golfing. The location data manager 410 may track the location of the player via a GPS device located on the vehicle 10 that the player is using for a current round of golf. For example, one or more players may be assigned a particular vehicle 10 prior to beginning a round of golf. The vehicle 10 may include one or more sensors 90, as described above, that are configured as GPS sensors. The location data manager 410 may receive GPS data from the sensors 90 in real time or substantially real time. The GPS data from the vehicle 10 may correspond to or generally track the location of the player and/or a golf ball of the player. For example, after tee shot, a player may drive the vehicle 10 near or along a path of the golf ball when the vehicle 10 is not restricted to the cart path (e.g., when weather or other conditions permit the vehicle 10 to be driven on the fairway). The location data for a round currently in play may be stored as current location data 412. Location data for previously played rounds may be stored as historical location data 414. In various embodiments, after a round is completed, the current location data 412 for the round may be transmitted and stored as the historical location data 414.

As shown in FIG. 4, the player account system 400 includes a telemetrics manager 420. The telemetrics manager 420 may be or include any device, component, element, or hardware designed or configured to track current and historic driving patterns of the player while golfing. For example, the telemetrics manager 420 may track driving patterns of the player on a per-hole basis. Driving patterns may be or include, for example, trends in location changes as a driver moves from location to location for a given hole. For example, on a given hole, each time the player plays the hole, the player may consistently move the vehicle 10 from the tee box to a left side of the green. Driving patterns for a round currently being played may be stored as current driving patterns 422. Driving patterns for previously-played rounds of golf may be stored as historical driving patterns 424. In various embodiments, driving patterns may also be determined by comparing, on a per-hole basis, a current driving pattern for one hole to one or more historical driving patterns for the same hole. Driving patterns may be used to determine spray patterns for shots on a particular hole over time. For example, the current driving patterns 422 and/or historical driving patterns data 424 may facilitate tracking the path that the vehicle 10 takes from the start of a hole to the finish of the hole. Based on collected data, the patterns may indicate which way(s) the player hits the ball. Such spray patterns may also associate current environmental conditions (e.g., sunny, raining, wind speed, wind direction, etc.) with the shots.

The fleet management system 450 may be or include any device, component, element, or hardware designed or configured to track performance data for one or players currently playing on the golf course, as well as other metrics or data impacting play for players on the golf course. The fleet management system 450 may be communicably coupled to one or more components of the remote systems 240, such as the player account system 400.

As shown in FIG. 4, the fleet management system 450 includes a player identification manager 452, a pace of play manger 454, an environment manager 456, a player manager 458, a pace of play predictor 460, and a tee sheet optimizer 462. The player identification manager 452 may be or include any device, component, element, or hardware designed or configured to associate information from the player account system 400 with the fleet management system 450. The player identification manager 452 may be communicably coupled to one or more components of the fleet management system 450.

The player identification manager 452 may be configured to receive or acquire information from the player account system 400, such as a player identification number. The player identification manager 452 may also be configured to receive or acquire an identification number of the vehicle 10 assigned to the player for the current round of play. The information received by the player identification manager 452 may allow the fleet management system 450 to associate information with the proper player account. For example, a pace of play determined by the pace of play manager 454 may be associated with a specific player or a specific vehicle 10. The player identification manager 452 is configured to receive or acquire information that allows the pace of play information to be correctly associated with a player. The player identification manager 452 may be configured to track previous records or player history for the course (e.g., the historical location data 414, the historical driving patterns 424, etc.). The player identification manager 452 may also be configured to receive or acquire information from the pace of play manager 454 and/or the location data manager 410 to determine how the player is performing during a round of golf. For example, the player identification manager 452 may receive an indication from the pace of play manager 454 that the player has spent a record low time on a certain hole. The player identification manager 452 may also be configured to receive an indication from the location data manager 410 that the player made a record low amount of stops on a given hole. The player identification manager 452 may then determine that the player has achieved a record number of strokes for the hole. The player identification manager 452 may transmit this information to a screen (e.g., operator interface 48) of the vehicle 10 for viewing by the player. For example, the operator interface 48 may display: "New stroke record for hole #14!"

In various embodiments, the player identification manager 452 may be configured to keep track of multiple players in one vehicle 10 in order to facilitate accurate pace of play determinations for each player. In various embodiments, the vehicle 10 may include sensors 90 that are configured as weight or pressure sensors. A weight or pressure sensor may be located beneath each seat of the vehicle 10 and may be configured to determine a weight of a player sitting on each seat. Additionally, the player account system 400 may store weight information regarding a weight of the player. This information may be used to determine which player is out of the vehicle 10 and currently playing the hole. For example, the vehicle 10 may be utilized by player A and player B. The player account system 400 may indicate that player A is 200 pounds and player B is 250 pounds. The weight or pressure sensors on the vehicle 10 may indicate that the 200 pound player A is on the driver's side of the vehicle while the 250 pound player B is on the passenger side. When the players initially sit on the vehicle 10, the sensors may determine a total weight of the passengers and/or their golf clubs. When the players arrive at a hole, the sensors may sense that pressure has been relieved from one of the sensors. For example, the sensors may determine that the 250 pounds of pressure are no longer on a pressure sensor on the passenger seat, so it can be determined that player B is currently golfing. Thus, the pace of play manager 454 may be able to track, for example, a duration of time that player B takes on a hole based on when the player's weight is added or removed from a weight or pressure sensor of the vehicle 10. Additionally or alternatively, the sensors 90 may include vision systems configured to detect who is and is not present in the vehicle 10 to determine who is and who is not currently hitting.

The pace of play manager 454 may be or include any device, component, element, or hardware designed or configured to track performance metrics and/or pacing of a round of golf of the player. The pace of play manager 454 may be communicably coupled to one or more components of the fleet management system 450. The pace of play manager 454 may be configured to track or determine an average pace that it takes the player to complete a round of golf. The pace of play manager 454 may also be configured to track or determine an average pace for each individual hole. The pace of play manager 454 may be configured to utilize data from the location data manager 410 and the telemetrics manager 420 to determine a pace of play for a player. For example, the pace of play manager 454 may receive GPS data indicating an amount of time a player spends on a particular hole and a total amount of time a player spends on a round of golf. Additional information on pace of play monitoring can be found in U.S. application Ser. No. 18/406,566, filed Jan. 8, 2024, the entirety of which is incorporated herein by reference.

The environment manager 456 may be or include any device, component, element, or hardware designed or configured to track or determine environmental conditions on the course. The environment manager 456 may be communicably coupled to one or more components of the fleet management system 450. The environment manager 456 may be configured to collect data regarding the current weather, temperature, wind direction and speed, etc., as well as past or historical weather data and predicted future weather conditions (e.g., using data from the sensors 90, sensors on the course, remote weather systems, etc.). The environment manager 456 may also be configured to determine playing conditions (e.g., uploaded through the user portal 230, detected via cameras around the course, detected via the sensors 90 of the vehicle 10, etc.). Playing conditions may include, for example, course conditions, such as any current repairs, obstructions, ground water saturation levels, etc. on the course.

The player manager 458 may be or include any device, component, element, or hardware designed or configured to track or determine a number of players on the course at a given time. The player manager 458 may be communicably coupled to one or more components of the fleet management system 450. The player manager 458 may be configured to track, using GPS location data from a plurality of the vehicles 10, the number of players on the course and their location. For example, the player manager 458 may be configured to determine that there are four carts and eight total people on a given hole, and fifty people on the course in total.

The pace of play predictor 460 may be or include any device, component, element, or hardware designed or configured to predict a pace of play for a player. The pace of play predictor 460 may be communicably coupled to one or more components of the fleet management system 450. The pace of play predictor 460 may be configured to use a predictive algorithm to predict a pace of play for a player on a particular day. The predicted pace of play may change based on a specific day and specific conditions for the course. The pace of play predictor 460 may utilize information from the player account system 400, the player identification manager 452, the pace of play manager 454, the environment manager 456, and the player manager 458 to predict the player's pace of play. In various embodiments, the player is assigned to a respective vehicle 10 prior to beginning a round. The operator interface 48 of the vehicle 10 may be controlled to display the predicted pace of play for the player assigned to the specific vehicle 10. For example, the operator interface 48 may indicate that the player is predicted to complete the first hole in thirteen minutes and the entire round in four hours. The predicted pace of play may be updated in real time or substantially real time as the player moves through the round of play. In various embodiments, the operator interface 48 is configured to display one or more of the inputs to the pace of play predictive algorithm, such as the course conditions, the number of players on the course, the pace of play of groups ahead, etc.

The tee sheet optimizer 462 may be or include any device, component, element, or hardware designed or configured to optimally assign tee times to a plurality of players that are playing on the course on a given day. The tee sheet optimizer 462 may be communicably coupled to one or more components of the fleet management system 450. The tee sheet optimizer 462 may be configured to receive or acquire information on each player that is scheduled to play on the golf course on a specific day. For example, the tee sheet optimizer 462 may be configured to receive information about each player's historical pace of play (e.g., for a similar day of the week, for similar weather conditions, etc.). The tee sheet optimizer 462 may also be configured to receive or acquire information from the environmental manager 456. The tee sheet optimizer 462 can use the data to order or reorder the tee sheet to optimize start times of different players. For example, the tee sheet optimizer 462 may be configured to order the tee times so that a player with a faster pace of play is not scheduled to tee off immediately after a player with a slower pace of play in order to prevent the player with the faster pace of play from interfering with or having to wait for the player with the slower pace of play to complete a hole.

In various embodiments, the information stored for each player in the player account system 400 and the fleet management system 450 may be viewed by one or more employees of the golf course (e.g., via the user portal 230). For example, the playing habits and/or performance data collected for each player associated with the golf course may be available to be viewed by an employee of the golf course. The playing habits and performance data may be synthesized or otherwise analyzed such that trends, habits, performance metrics, user preferences, pace of play, etc. for a plurality of players can be viewed and easily understood. The employee may be able to review the data and utilize the information to determine renovations or changes to make to the golf course. For example, the employee may be able to view an average skill level of some or all of the players associated with the golf course, a playing style of some or all of the players associated with the golf course, etc. For example, a hole on the golf course may be a par of 4. The average skill level of the players (or, in various embodiments, another metric) may indicate that 95% of players record a 5 or above on the hole. The golf course employees may review this data and determine that the hole is too difficult for players. Subsequently, the hole may be renovated or otherwise modified to reduce the difficultly of the hole in accordance with the skill level of the players. Additionally, in various embodiments, data, such as golf cart location data from the location data manager 410 and/or driving pattern data from the telemetrics manager 420, may be used to renovate the golf course. For example, location data (e.g., current location data 412, historical location data 414, etc.) and/or driving patterns (e.g., current driving patterns 422, historical driving patterns 424, etc.) may indicate that players veer off or almost veer off the golf cart path at a particular bend in the path. The employees at the golf course may utilize this data to renovate the golf cart path such that players have an easier time navigating the path. For example, the path may be modified such that the bend in the path is not as sharp and carts do not veer off path as frequently at the bend. In some embodiments, the remote systems 240 are configured to provide recommendations for renovations to the golf course based on analysis performed thereby on the playing habits and performance data (e.g., location data, the driving patterns, the pace of play information, shot paths and spray patterns, average strokes on holes, etc.).

Figure 5:
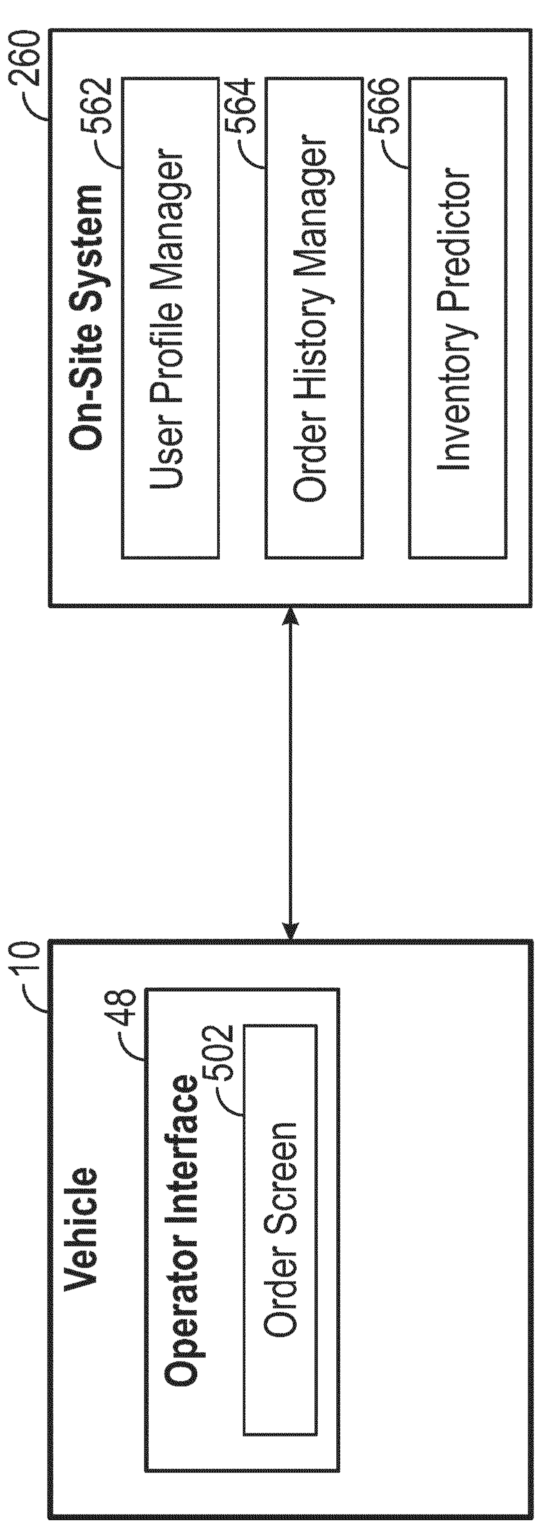
FIG. 5 is a schematic block diagram of a remote system of the site monitoring and control system of FIG. 3, according to an exemplary embodiment.

Referring now to FIG. 5, communication between the vehicle 10 and the on-site system 260 is shown. While shown as being the on-site system 260, in some embodiments, the concepts disclosed herein with reference to FIG. 5 are additionally or alternatively implemented with the off-site server 250. In various embodiments, the on-site system 260 may be or include any device, component, element, or hardware designed or configured for use by a beverage cart attendant, halfway house employee, a clubhouse employee, a course restaurant employee, or any other course employee that can receive an order from a player on the golf course. For example, the on-site system 260 may be part of a system for ordering food and beverage. An employee of the golf course may receive an order placed by a player on the course (e.g., via the operator interface 48, via the user device 230, etc.). Components of the on-site system 260 that will be described below may facilitate an enhanced ordering process for a player. As an example, an employee may receive a prediction of what a player will order and when they will order it, so the employee can have the order prepared by the time the player arrives at the halfway house. As another example, a golf course may receive predicted orders based on a tee sheet for a day and so that the golf course can make sure proper inventory is present throughout the golf course (e.g., in the clubhouse, halfway house, drink cart, etc.).

As described above with reference to FIG. 2, the vehicle 10 may include an operator interface 48. As shown in FIG. 5, the operator interface 48 is configured to provide an order screen 502. In some embodiments, the user device 232 is configured to provide the order screen 502. The operator interface 48 (or the user device 232) may be communicably coupled to one or more components of the on-site system 260, such as an order history manager 564. A user may place an order for food or beverage using the order screen 502 at any time during a round. The order screen 502 may specify whether the order is to be placed and picked up at the halfway house or if the order is to be placed and delivered to the player on the course by a beverage cart. In various embodiments, the order screen 502 may include a list of food and beverage options for the player to select from. The order screen 502 may also include a keyboard for the player to add comments to the order. The order screen 502 may include an option to schedule a time or location to receive the order. For example, the player may schedule the order to be delivered on a beverage cart at the 6th hole. Additionally, the order screen 502 may include an option for the player to select an account or payment method to charge the order to. The order screen 502 may also include an option to tip an employee.

In various embodiments, the order screen 502 may include an order recommendation for the user. For example, the order screen 502 may provide a notification or recently ordered tab indicating previously-ordered or "favorite" items that the player may order again. In various embodiments, the vehicle 10 may use data from the location data manager 410 alone or in combination with an order history of a player to determine when the player may want to place an order. For example, location data may indicate that the player consistently orders a first beverage at the $5^{th}$ hole. During a current round of golf, the current location data 412 may indicate that the vehicle 10 is near the end of the $4^{th}$ hole. The order screen 502 may then generate a prompt asking if the player would like to place an order. The prompt may include a previously-ordered beverage. For example, a prompt may state: "You typically order a water at the $5^{th}$ hole. Would you like to place an order for a water now?" The order may be processed before the player reaches their location (e.g., the $5^{th}$ hole) so that the beverage cart is at the $5^{th}$ hole with the water before the player reaches the hole. This may reduce a total time the player spends between holes and may provide the player with a smoother and more enjoyable playing experience.

As shown in FIG. 5, the on-site system 260 includes a user profile manager 562, an order history manager 564, and an inventory predictor 566. The user profile manager 562 may be or include any device, component, element, or hardware designed or configured to associate orders from a vehicle 10 with a user or user profile of a player. For example, if a vehicle 10 has more than one player using the vehicle 10 and a player places an order, the user profile manager 562 may determine which player placed the order, and may determine or retrieve information on the player. The user profile manager 562 may also include payment information for the player. The user profile manager 562 may be communicably coupled to one or more components of the remote systems 240, such as the fleet management system 450, and the vehicle 10.

The order history manager 564 may be or include any device, component, element, or hardware designed or configured to track previous orders of a player. The order history manager 564 may be communicably coupled to one or more components of the remote systems 240, such as the fleet management system 450, and the vehicle 10. The order history manager 564 may be configured to store a list of previous orders made by a player. For example, the order history manager 564 may include information about what the player ordered, what time the order was place, where the player was on the course when the order was placed, and whether the order was for the halfway house, a beverage cart, course restaurant, clubhouse, etc. The order history manager 564 may also be configured to identify trends or habits in a player's order history. For example, the order history manager 564 may be configured to determine that a player typically orders a first drink from the beverage cart on the $5^{th}$ hole, orders food and a second beverage at the halfway house, and a third drink on the $16^{th}$ hole. The order history manager 564 may be configured to transmit these trends to the vehicle 10 for viewing by the player on the order screen 502.

In various embodiments, location data may be used to cater to a player experience on the golf course. For example, the current location data 412 may be utilized with the historical location data 414 to determine when a player will be at a halfway house. For example, the historical location data 414 may indicate that the player typically arrives at the halfway house two hours into the round. The current location data 412 may provide an actual time the player is at the halfway house for a current round being played and/or a current location of the player two hours into the round. One or more employees at the halfway house may receive an indication that the player is going to arrive at the halfway house in five minutes. The employees may use the location data and the order history of the user to prepare a beverage that the player is predicted to order.

The inventory predictor 566 may be or include any device, component, element, or hardware designed or configured to predict an inventory for various locations across a course (e.g., for the halfway house, for the beverage carts, for the clubhouse, for a course restaurant, etc.) based on player preferences and order histories. The inventory predictor 566 may be communicably coupled to one or more components of the remote systems 240, such as the fleet management system 450, and the vehicle 10.

The inventory predictor 566 may be configured to predict a food and beverage inventory needed for a given day. The inventory predictor 566 may be configured utilize a tee sheet, in addition to information from the user profile manager 562 and the order history manager 564, to predict an inventory. For example, the tee sheet for a day may indicate what players are playing the course and at what times. The inventory predictor 566 may be configured to retrieve user profile information from the user profile manager 562 for players identified on the tee sheet. The order history manager 564 may determine an order history for the players identified on the tee sheet. In various embodiments, the inventory predictor 566 may be configured to utilize additional information from the fleet management system 450, such as pace of play information, to predict when a player will arrive at the halfway house, order from the beverage cart, etc. The inventory predictor 566 may then be configured to determine which players will arrive at the halfway house and when. The inventory predictor 566 may be configured to utilize an optimization algorithm or other method to determine what inventory should be stocked in the halfway house, the beverage carts, the clubhouse, the course restaurant, etc. and when. For example, the inventory predictor 566 may predict that the halfway house will need one hundred hamburgers in a day. The inventory predictor 566 may also determine and indicate to an employee at the halfway house that ten hamburgers should be cooked and ready to serve by 11:00 am, and an additional fifty should be cooked and ready to serve by 1:00 pm. In various embodiments, the inventory predictor 566 may be used to stock inventory in a pro shop. For example, the order history of the player may be for a history of items (e.g., clothing, clubs, tees, golf balls, etc.) purchased at the pro shop. The order history manager 564 may track a duration of time between purchases and indicate to the inventory predictor 566 when the player is predicted to purchase an item and may indicate what items the player is likely to purchase.

Figure 6A:
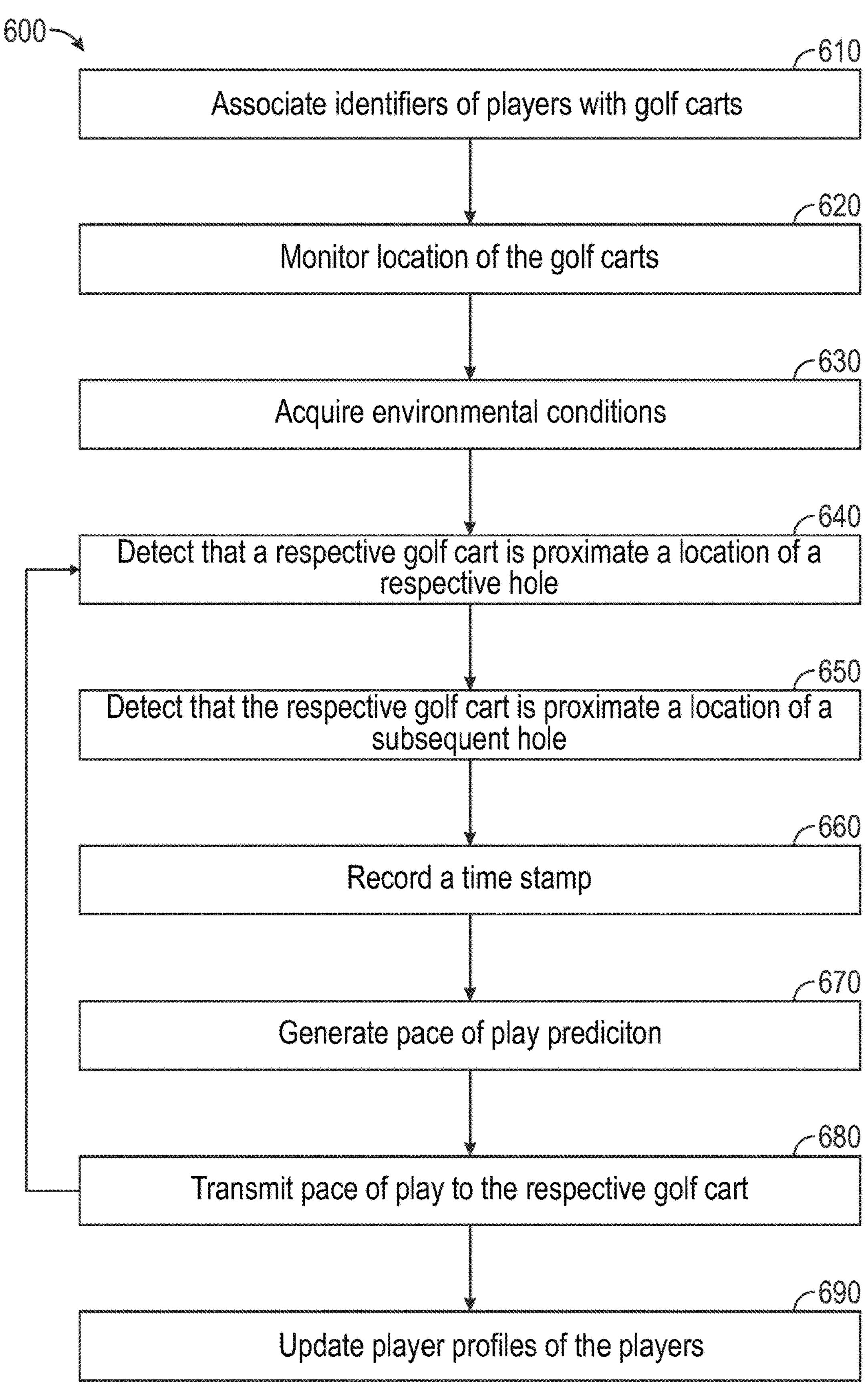
FIGS. 6A-6C are flow diagrams of a method for generating a user profile for a user operating a golf cart based on driving habits of the user, according to an exemplary embodiment.
Figures 6B, 6C:
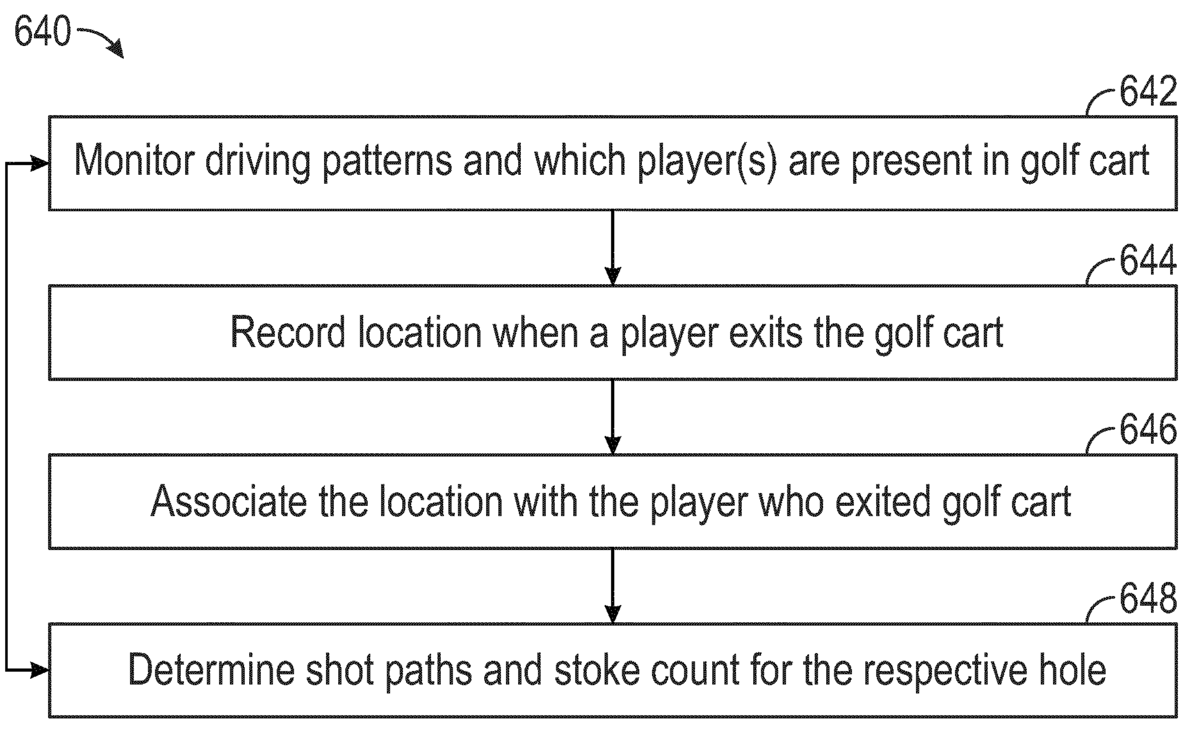

Referring now to FIGS. 6A-6C, flow diagrams for a method 600 is shown, according to an exemplary embodiment. The method 600 may be utilized when determining a pace of play for golfers. The method 600 may be used to generate and update user profiles for users operating golf carts based on driving habits of the players.

At step 610, identifiers of players are associated with golf carts (e.g., the vehicle 10) assigned to each player. An identifier associated with the player may be, for example, a member identification number that links a user or member profile with a specific player. The player may be associated with a specific golf cart to allow the player to receive user-specific information (e.g., a user-specific pace of play, order history, etc.) and transmit data via the golf cart that can be identified as associated with the player (e.g., the halfway house can associate an order with the player and the golf cart).

At step 620, a location of the golf carts is monitored. The location of the golf carts may be detected (e.g., via a first sensor configured to be positioned on the golf carts, a GPS sensor, one or more of the sensors 90). The location data may be stored by the location data manager 410 as current location data 412 or historical location data 414. The location of the golf carts may be detected responsive to the golf carts entering the golf course (e.g., the player assigned a golf cart having driven onto the course).

At step 630, information associated with an environmental condition of a golf course is acquired. The environmental condition information may be acquired by the environment manager 456 of the fleet management system 450. In various embodiments, an environmental condition may be an air temperature, a wind speed, precipitation, and/or a course condition. The course condition may be a condition of the golf course such as ground water saturation.

At step 640, the location of a respective golf cart of the golf carts is detected to be proximate a location corresponding to a respective hole (e.g., a first hole, a second hole, etc.) of the golf course. For example, current location data 412 may indicate that the player is at a location of the respective hole on the course. The location may be detected responsive to a determination that the player is on the course and has started a round of golf (e.g., by determining a current time of day and cross-referencing with a tee sheet schedule, etc.).

In some embodiments, step 640 includes steps 642-648. At step 642, the driving patterns and which player(s) are present in the respective golf cart are monitored (e.g., via the first sensor configured to be positioned on the golf cart, a second sensor configured to be positioned on the golf cart, a telemetrics sensor, one or more of the sensors 90, a weight/seat sensor, a camera, a vision system, a motion sensor, an occupancy sensor, etc.). Specifically, for each respective hole, the driving patterns or paths at which the respective golf cart takes and locations of where the respective golf cart stops on the respective hole are monitored. At step 644, the location of the respective golf cart is recorded when the golf cart stops and a player exits the respective golf cart (e.g., using weight sensors, using machine vision systems, etc.). At step 646, the location is associated with the player who exited the respective golf cart. Steps 642-646 are repeated for the respective hole until the respective golf cart moves on to a subsequent hole (at Step 650). At step 648, the shot paths and stroke count for the respective hole are determined based on the driving path of the respective golf cart and the locations where the player exited the golf cart. Accordingly, player statistics and shot history (e.g., average strokes on the respective hole, historical shot spray chart, etc.) can be generated for the player's benefit. Environmental conditions (e.g., sunny, raining, wind speed, wind direction, etc.) may also be determined and record for the shot paths to provide added player benefit (e.g., future club choice during similar weather conditions).

At step 650, the location of the respective golf cart is detected to be proximate a location corresponding to a subsequent hole (e.g., a second hole, a third hole, etc.) of the golf course. For example, current location data 412 may indicate that the player is at a location of the subsequent hole on the course. The location may be detected responsive to a determination that the respective golf cart has moved from a location corresponding to the respective hole to a location corresponding to the subsequent hole.

At step 660, a time stamp is recorded. The time stamp may be associated with a duration of time spent at the respective hole, the duration of time beginning when the control system detects that the location of the respective golf cart is proximate the location corresponding to the respective hole and ending when the control system detects that the location of the respective golf cart is proximate the location corresponding to the subsequent hole (e.g., left the green area of the respective hole to head towards the tee box of the subsequent hole). For example, a timestamp may begin when GPS data indicates that a player arrives at a respective hole. Using GPS and location data, one or more components of the fleet management system 450 may determine that the player has moved from one location to another while still being "in bounds" with the respective hole. In this scenario, the duration of time may not end. When the control system detects that the location of the golf cart corresponds to a location of a subsequent hole (e.g., moves "out of bounds" of the respective hole), the duration of time may end. The control system may generate, based on a plurality of time stamps, an average pace of play for the player. For example, the control system may determine 18 different time stamps corresponding to eighteen different holes. The control system (e.g., the pace of play manager 454) may determine an average time for each hole. The pace of play manager 454 may utilize time stamps corresponding to a plurality of rounds of golf to determine an average pace of play on a per-round basis. In various embodiments, the pace of play manager 454 may utilize time stamps of individual holes in a plurality of rounds to determine an average pace of play on a per-hole basis.

At step 670, a predicted pace of play of the player is generated. The predicted pace of play may be based on the environmental condition, past history for the player, the location of the other golf carts, the past history of the players associated with the other golf carts, and the time stamp. For example, the pace of play predictor 460 may utilize environmental conditions, a crowdedness of the golf course (based on the locations of the other golf carts and the number of players on the golf course), and a previous pace of play (e.g., determined by one or more time stamps) for all of the golfers on the course to generate a predicted pace of play for the current round of golf or a future round of golf (if the round has not yet started). The predicted pace of play may be generated responsive to a determination that a player is about to start a new round of golf and updated at the player progresses through the round.

At step 680, the predicted pace of play for the player is transmitted to a screen of the respective golf cart. For example, the pace of play predictor 462 may transmit the predicted pace of play to the golf cart (e.g., vehicle 10) for display on the operator interface 48 of the vehicle 10. The predicted pace of play may be transmitted responsive to a player being assigned a respective golf cart prior to a round of golf being played and updated as the player progresses through the round. Steps 640-680 may be repeated for each player as the round progresses to provide the most accurate and up-to-date prediction.

At step 690, player profiles associated with each of the players is updated during and/or at the end of their round of golf (e.g., with pace of play information for the round, with stroke statistics, with shot path information, with environmental conditions, etc.). The updated player profiles may then be used to perform various processes and optimization for future tee sheets and course design, as described in greater detail herein.

In some embodiments, step 690 includes steps 692-696. At step 692, the pace of play for various players are aggregated and stored (e.g., within the player profiles). At step 694, a tee sheet for a future date or the current date before golf for the day commences is acquired. At step 696, the tee sheet is optimized based on the player profiles of the players on the tee sheet. By way of example, the historical pace of play for each player, the environmental conditions for during play of the tee sheet, who is grouped with who on the tee sheet, preferred playes start times, etc. may be taken into account to optimize the order of the tee sheet so that the round of golf for each player can be most efficient and enjoyable by attempting to order players such that there are no bottle necks in play for the day.

Figure 7:
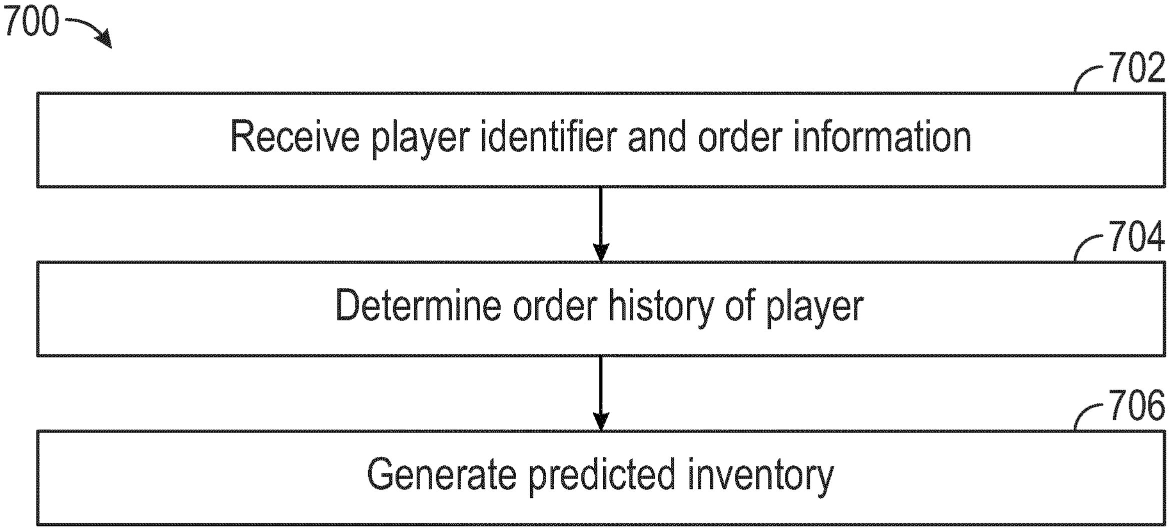
FIG. 7 is a flow diagram of a method for predicting inventory based on a user profile, according to an exemplary embodiment.

Referring now to FIG. 7, a flow diagram for a method 700 is shown, according to an exemplary embodiment. The method 700 may be utilized when generating a predicted inventory for a beverage cart, halfway house, clubhouse, restaurant, etc. of a golf course.

At step 702, a player identifier and an order may be received (e.g., by the on-site system 260, by the remote systems 240, etc.). The order may be received responsive to a player on the course placing an order via the order screen 502 of the vehicle 10 assigned to the player or a user device 232 associated with the player. The player identifier may also be received via the vehicle 10. For example, when a player places an order, the order may be received with player identifier (e.g., a member account number). In various embodiments, the user profile manager 562 may utilize the received player identifier to determine or retrieve a player profile of the player. The player profile may include, for example, pace of play information.

At step 704, an order history of the player is determined. The order history may be determined responsive to the on-site system 260 receiving the order and the player identifier. The order history manager 562 may utilize the player profile determined by the user profile manager 562 to retrieve an order history of the player. The order history may include a plurality of orders made by the user (including the order place in step 702). In various embodiments, the order history may be specific to where the order is being placed. For example, if the player has placed an order with the halfway house, the order history may only include previous orders made at the halfway house (e.g., the history does not include beverage cart orders).

At step 706, an inventory is predicted. The inventory predictor 566 may predict the inventory responsive to the order history being generated as players continue to play rounds on the course. The inventory predictor 566 may utilize previous orders, in addition to player profile information (e.g., a pace of play) to determine what items should be stocked and at what times to be ready to provide the player with items they are predicted to order, before they place the order. In various embodiments, the inventory may be predicted prior to the player placing an order. For example, the halfway house may receive an indication, from, for example, a tee sheet, of which players are on the course on a given day. The halfway house may then receive order histories associated with the players on the tee sheet. The inventory predictor 566 may also utilize pace of play information to determine which players will arrive at the halfway house and when. The inventory predictor 566 can then generate a list of items that should be stocked and/or prepared for players by the time they arrive at the halfway house. Further, recommended orders may be transmitted to players as they progress along a round of golf based on their history.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two players directly or indirectly to one another. Such joining may be stationary (e.g., permanent or fixed) or moveable (e.g., removable or releasable). Such joining may be achieved with the two players coupled directly to each other, with the two players coupled to each other using a separate intervening player and any additional intermediate players coupled with one another, or with the two players coupled to each other using an intervening player that is integrally formed as a single unitary body with one of the two players. If "coupled" or variations thereof are modified by an additional term (e.g., directly coupled), the generic definition of "coupled" provided above is modified by the plain language meaning of the additional term (e.g., "directly coupled" means the joining of two players without any separate intervening player), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and descriptions may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle controller 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf system comprising:

one or more processing circuits including one or more memory devices coupled to one or more processors, the one or more memory devices configured to store instructions thereon that, when executed by the one or more processors, cause the one or more processors to:

associate an identifier of a respective player assigned to a golf cart with the golf cart;

monitor at least one of (i) locations of the golf cart about a golf course using at least one of GPS information or real-time kinematics information based on data acquired by one or more sensors, (ii) purchases made on the golf course during a current round of golf associated with the identifier based on one or more signals transmitted from the golf cart, or (iii) a play history for the respective player during the current round of golf;

update a player profile for the respective player based on the identifier and the at least one of the locations of the golf cart, the purchases, or the play history;

analyze one or more player profiles associated with one or more players including the respective player, the one or more player profiles including the player profile for the respective player, and each of the one or more player profiles including at least one of (i) a past golf cart driving history for one of the one or more players, (ii) past purchases made by one of the one or more players, or (iii) a past play history of one of the one or more players; and provide one or more recommendations based on the analysis of the one or more player profiles.

2. The golf system of claim 1, wherein the instructions cause the one or more processors to:

monitor the locations of the golf cart about the golf course and the purchases made on the golf course associated with the identifier; and update the player profile for the respective player based on the identifier, the locations of the golf cart, and the purchases.

3. The golf system of claim 1, wherein the instructions cause the one or more processors to:

monitor the locations of the golf cart about the golf course; and record the locations of the golf cart in response to detecting the respective player has exited the golf cart.

4. The golf system of claim 3, wherein the instructions cause the one or more processors to determine a shot path for a respective hole based on the locations recorded for the respective hole, and wherein the player profile is updated to include the shot path.

5. The golf system of claim 4, wherein the instructions cause the one or more processors to record an environmental condition associated with the shot path.

6. The golf system of claim 3, further comprising:

a first sensor configured to be positioned on the golf cart to facilitate monitoring the locations of the golf cart; and a second sensor configured to be positioned on the golf cart to facilitate detecting the respective player exiting the golf cart.

7. The golf system of claim 6, wherein the first sensor includes a GPS sensor, and the second sensor includes at least one of a weight sensor, a motion sensor, an occupancy sensor, a camera, or a vision system.

8. The golf system of claim 1, wherein the instructions cause the one or more processors to:

monitor the purchases made on the golf course associated with the identifier;

update the player profile of the respective player with a purchase history for the respective player based on the purchases;

acquire a tee sheet for a future point in time including a list of players; and predict an inventory of goods to have present on the golf course based on the player profile of the respective player in response to the list of players including the respective player.

9. The golf system of claim 1, wherein the instructions cause the one or more processors to:

monitor the purchases made on the golf course associated with the identifier and the locations of the golf cart at a time of the purchases; and update the player profile of the respective player with a purchase history for the respective player based on the purchases and the locations of the golf cart at the time of the purchases.

10. The golf system of claim 9, wherein, at a future date in time, the instructions cause the one or more processors to recommend a purchase of a respective good to the respective player based on the player profile of the respective player in response to a current location of the golf cart associated with the respective player being proximate a past location on the golf course where a previous purchase of the respective good was purchased.

11. The golf system of claim 9, wherein, at a future date in time, the instructions cause the one or more processors to instruct preparation of a respective good for the respective player based on the player profile of the respective player in response to a current location of the golf cart associated with the respective player being proximate a past location on the golf course where a previous purchase of the respective good was purchased.

12. The golf system of claim 1, wherein the instructions cause the one or more processors to:

monitor the locations of the golf cart about the golf course;

determine a pace of play for the respective player based on the locations; and update the player profile of the respective player with the pace of play.

13. The golf system of claim 12, wherein the instructions cause the one or more processors to:

acquire a tee sheet for a future point in time including a list of players including the respective player; and optimize the tee sheet based on player profiles corresponding to each player in the list of players on the tee sheet.

14. The golf system of claim 13, wherein the tee sheet is optimized based on preferred start times of each player.

15. The golf system of claim 1, wherein the instructions cause the one or more processors to:

acquire an environmental condition at the golf course;

monitor the locations of a plurality of golf carts including the golf cart;

acquire a tee sheet a including a list of players currently playing the golf course including the respective player;

acquire past play history from player profiles associated with the list of players currently playing the golf course; and generate a predicted pace of play for the respective player based on the environmental condition, the locations of the plurality of golf carts, and the past play history.

16. The golf system of claim 15, wherein the instructions cause the one or more processors to transmit the predicted pace of play for display via at least one of a display device of the golf cart or a personal device associated with the respective player.

17. The golf system of claim 1, wherein providing the one or more recommendations comprises providing one or more recommendations for renovations to at least one of a hole of the golf course or a path between holes of the golf course based on the analysis.

18. A golf system comprising:

a non-transitory computer-readable medium having instructions stored thereon that, when executed by one or more processors, cause the one or more processors to:

associate an identifier of a respective player assigned to a golf cart with the golf cart;

monitor, based on data acquired by one or more sensors, locations of the golf cart about a golf course using at least one of GPS information or real-time kinematic information;

monitor, based on one or more signals transmitted from the golf cart, purchases made on the golf course during a current round of golf associated with the identifier;

monitor a play history for the respective player during the current round of golf;

update a player profile for the respective player based on the identifier, the locations of the golf cart, the purchases, and the play history;

analyze one or more player profiles associated with one or more players including the respective player, the one or more player profiles including the player profile for the respective player, and each of the one or more player profiles including a past golf cart driving history for one of the one or more players, past purchases made by the one of the one or more players, and a past play history of the one of the one or more players; and provide one or more recommendations based on the analysis of the one or more player profiles.

19. The golf system of claim 18, wherein the instructions cause the one or more processors to:

record the locations of the golf cart in response to detecting the respective player has exited the golf cart;

determine a shot path for a respective hole based on the locations recorded for the respective hole;

update the player profile to include the shot path;

update the player profile with a purchase history for the respective player based on the purchases; and at least one of:

(a) acquire a tee sheet for a future point in time including a list of players and predict an inventory of goods to have present on the golf course based on the player profile of the respective player in response to the list of players including the respective player;

(b) recommend a purchase of a respective good to the respective player based on the player profile of the respective player in response to a current location of the golf cart associated with the respective player being proximate a past location on the golf course where a previous purchase of the respective good was purchased; or (c) instruct preparation of a respective good for the respective player based on the player profile of the respective player in response to the current location of the golf cart associated with the respective player being proximate the past location on the golf course where the previous purchase of the respective good was purchased.

20. A golf system comprising:

a non-transitory computer-readable medium having instructions stored thereon that, when executed by one or more processors, cause the one or more processors to:

associate an identifier of a respective player assigned to a golf cart with the golf cart;

monitor, based on data acquired by one or more sensors, locations of the golf cart about a golf course using at least one of GPS information or real-time kinematics information;

monitor, based on one or more signals transmitted from the golf cart, purchases made on the golf course associated with the identifier;

update a player profile for the respective player based on the identifier, the locations of the golf cart, and the purchases; and at least one of:

(a) acquire a tee sheet for a future point in time including a list of players and predict an inventory of goods to have present on the golf course based on the player profile of the respective player in response to the list of players including the respective player;

(b) recommend a purchase of a respective good to the respective player based on the player profile of the respective player in response to a current location of the golf cart associated with the respective player being proximate a past location on the golf course where a previous purchase of the respective good was purchased; or (c) instruct preparation of a respective good for the respective player based on the player profile of the respective player in response to the current location of the golf cart associated with the respective player being proximate the past location on the golf course where the previous purchase of the respective good was purchased.

* * * * *